(12) United States Patent
Yang

(10) Patent No.: US 9,327,646 B2
(45) Date of Patent: May 3, 2016

(54) SYSTEM AND METHOD OF ILLUMINATION EXPRESSION OF HEAD UP DISPLAY FOR VEHICLE

(71) Applicants: Hyundai Motor Company, Seoul (KR); Kia Motors Corporation, Seoul (KR)

(72) Inventor: Deok Jin Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 14/338,790

(22) Filed: Jul. 23, 2014

(65) Prior Publication Data

US 2015/0175069 A1 Jun. 25, 2015

(30) Foreign Application Priority Data

Dec. 23, 2013 (KR) ........................ 10-2013-0161697

(51) Int. Cl.
*G09G 5/00* (2006.01)
*B60Q 11/00* (2006.01)
*G02B 27/01* (2006.01)
*B60Q 9/00* (2006.01)

(52) U.S. Cl.
CPC ................ *B60Q 11/005* (2013.01); *B60Q 9/00* (2013.01); *G02B 27/01* (2013.01); *G02B 2027/014* (2013.01); *G02B 2027/0118* (2013.01)

(58) Field of Classification Search
CPC ......... B60Q 11/005; B60Q 9/00; G02B 27/01
USPC .............................................. 340/458; 345/7
See application file for complete search history.

(56) References Cited

U.S. PATENT DOCUMENTS

| | | | | |
|---|---|---|---|---|
| 5,053,755 A * | 10/1991 | Smith | ................ | G02B 27/0018 340/980 |
| 6,359,737 B1 * | 3/2002 | Stringfellow | ...... | G02B 27/0101 250/214 VT |
| 6,731,435 B1 * | 5/2004 | Kormos | ............ | G02B 26/0816 345/7 |
| 8,912,978 B2 * | 12/2014 | Szczerba | ............... | G01S 13/723 340/425.5 |
| 2001/0040534 A1 * | 11/2001 | Ohkawara | ................ | G09G 5/00 345/7 |
| 2002/0196201 A1 * | 12/2002 | Rosen | .................... | B60K 35/00 345/7 |

(Continued)

FOREIGN PATENT DOCUMENTS

| | | |
|---|---|---|
| JP | 2004-271830 A | 9/2004 |
| JP | 2009-101732 A | 5/2009 |

(Continued)

*Primary Examiner* — Hai Phan
*Assistant Examiner* — Zhen Y Wu
(74) *Attorney, Agent, or Firm* — Mintz Levin Cohn Ferris Glovsky and Popeo, P.C.; Peter F. Corless

(57) ABSTRACT

A system and method for illumination brightness of a head up display for a vehicle are provided. The method includes turning on, by a controller, the vehicle and the head up display and determining whether an auto light is operated. The head up display is illuminated when the auto light is normally operated. The controller determines whether a tail lamp mounted within the vehicle is operated when the auto light is abnormally operated. The head up display is illuminated as a night condition when an exterior night condition is detected and the tail lamp is normally operated. Additionally, the controller determines whether a tail switch is operated when the tail lamp is abnormally operated. The head up display is illuminated as a daytime condition when an exterior daytime condition is detected and the tail switch is abnormally operated.

18 Claims, 1 Drawing Sheet

(56) References Cited

U.S. PATENT DOCUMENTS

| | | | |
|---|---|---|---|
| 2003/0025078 A1* | 2/2003 | Yamaguchi | B60Q 1/14 250/330 |
| 2004/0183750 A1* | 9/2004 | Nagano | G02B 27/0101 345/7 |
| 2006/0043295 A1* | 3/2006 | Satou | B60R 1/00 250/330 |
| 2006/0115126 A1* | 6/2006 | Watanabe | G06K 9/00362 382/106 |
| 2009/0122139 A1* | 5/2009 | Grimmel | G02B 27/01 348/148 |
| 2009/0135092 A1* | 5/2009 | Uematsu | G02B 27/0101 345/7 |
| 2009/0140845 A1* | 6/2009 | Hioki | B60K 35/00 340/425.5 |
| 2010/0066645 A1* | 3/2010 | Ishii | G02B 27/0101 345/7 |
| 2010/0164702 A1* | 7/2010 | Sasaki | G01B 21/22 340/438 |
| 2010/0253597 A1* | 10/2010 | Seder | B60R 1/00 345/7 |
| 2010/0292886 A1* | 11/2010 | Szczerba | G01C 21/365 701/31.4 |
| 2011/0050738 A1* | 3/2011 | Fujioka | G09G 3/36 345/690 |
| 2012/0200476 A1* | 8/2012 | Kanamori | G02B 27/0101 345/7 |
| 2012/0224062 A1* | 9/2012 | Lacoste | G01C 21/365 348/148 |
| 2013/0194110 A1* | 8/2013 | Kim | G02B 27/01 340/905 |
| 2014/0091988 A1* | 4/2014 | Masuda | G02B 27/0149 345/7 |
| 2015/0057880 A1* | 2/2015 | Murzyn | G02B 27/01 701/36 |
| 2015/0062469 A1* | 3/2015 | Fleury | B60J 3/04 349/14 |

FOREIGN PATENT DOCUMENTS

| | | |
|---|---|---|
| KR | 10-2003-0047683 A | 6/2003 |
| KR | 10-0673833 | 1/2007 |
| KR | 10-2008-0045849 | 5/2008 |
| KR | 10-2013-0012629 | 2/2013 |
| KR | 10-2013-0089397 A | 8/2013 |

* cited by examiner

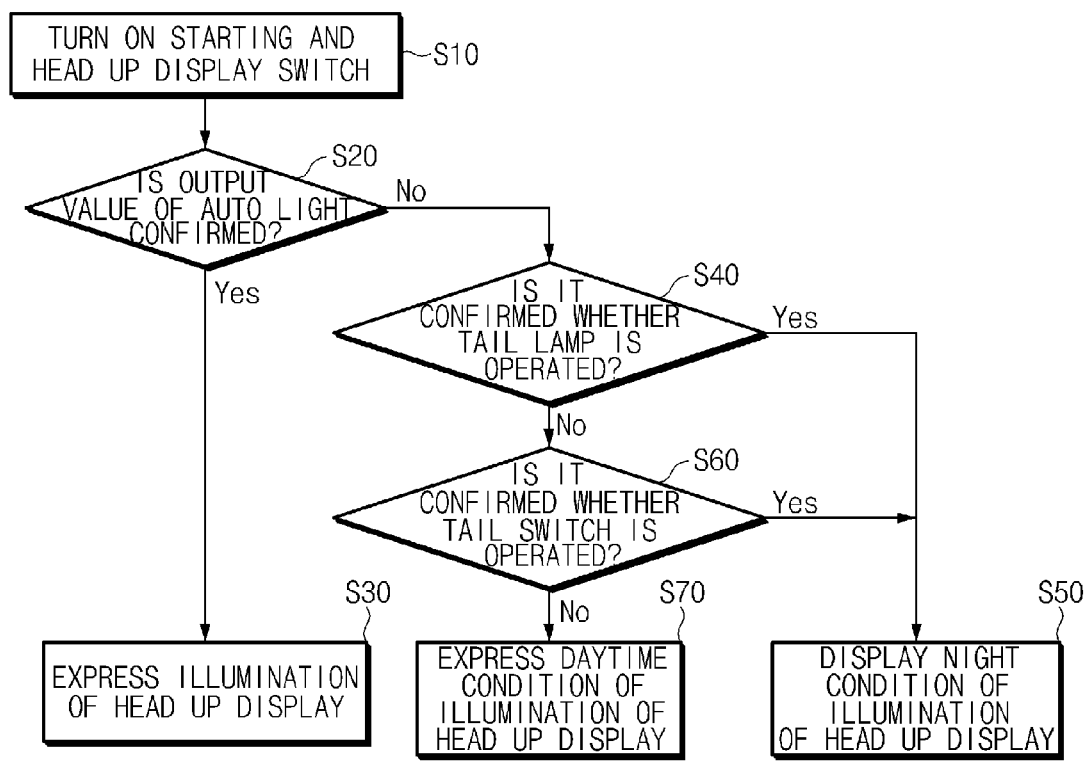

SYSTEM AND METHOD OF ILLUMINATION EXPRESSION OF HEAD UP DISPLAY FOR VEHICLE

CROSS-REFERENCE TO RELATED APPLICATION

This application is based on and claims priority from Korean Patent Application No. 10-2013-0161697, filed on Dec. 23, 2013 in the Korean Intellectual Property Office, the disclosure of which is incorporated herein in its entirety by reference.

BACKGROUND

1. Field of the Invention

The present invention relates to a method of illumination expression of a head up display for a vehicle, and more particularly, to a method of illumination expression of a head up display for a vehicle that illuminates the head up display even when external illumination of the head up display is not input due to an auto light failure.

2. Description of the Prior Art

Generally, a head up display has been used to display various types of information, such as a speed, a location, and a remaining fuel level of an aircraft or a vehicle, on a background of the external environment in the aircraft or other vehicles. A driver may simultaneously view information images, which overlap within the head up display, on a background screen.

Meanwhile, the head up display apparatus applied to the vehicle reflects output images from a reflection mirror and projects the reflected output images to a windshield glass serving as a combinder to help a driver see virtual images outside the windshield glass, thereby providing the driver with driving information. The head up display is embedded in a dash board in front of a driver's seat or is mounted on the dash board.

Since the expressing of the head up display is expressed on a driver's view, the head up display according to the related art sets a predetermined illumination value by recognizing external illuminance with an auto light so as not to hinder the driver's view and performs expression depending on a setting of the head up display.

However, the head up display according to the related art interlocks with an auto light sensor to set an appropriate illumination value associated with the head up display so as to be able to change illumination brightness of the head up display depending on the external illumination, but when the auto light sensor is broken or a signal is not properly transferred due to communication disturbance, the head up display screen sleeps, such that even in the state in which the head up display is not broken, the driver may not normally see the screen, thereby deteriorating marketability.

Patent 1: Korean Patent Laid-Open Publication No. 10-2008-0045849

SUMMARY

The present invention provides a method of illumination expression of a head up display for a vehicle that illuminates the head up display even when external illumination of the head up display is not input due to an auto light failure.

In one aspect of the present invention, a method of illumination expression of a head up display for a vehicle may include: turning on a vehicle and the head up display mounted within the vehicle; determining whether an auto light is operated by confirming an output value of the auto light mounted within the vehicle and that interlocks with the head up display; illuminating the head up display in response to determining that the auto light is normally operated; determining whether a tail lamp mounted within the vehicle is operated in response to determining that the auto light is abnormally operated; illuminating the head up display as a night condition in response to determining that the tail lamp is normally operated and in response to determining a predetermined exterior light (e.g., dark exterior conditions); determining whether a tail switch is operated in response to determining that the tail lamp is abnormally operated; and illuminating the head up display as a daytime condition in response to determining that the tail switch is abnormally operated and in response to determining exterior day light conditions.

The method of illumination expression of a head up display for a vehicle may further include: illuminating the head up display as the night condition in response to determining that the tail switch is normally operated and in response to determining exterior night conditions (e.g., light is below a predetermined level). The illumination brightness of the head up display may be set to be a predetermined basic output value of the head up display when the auto light is normally operated. When the basic output value of the head up display is set, the head up display may interlock with the auto light. The illumination brightness of the head up display may be output to meet night illumination brightness set separately. The illumination brightness of the head up display may be output to meet daytime illumination brightness set separately.

BRIEF DESCRIPTION OF THE DRAWINGS

The above and other objects, features and advantages of the present invention will be more apparent from the following detailed description taken in conjunction with the accompanying drawings, in which:

FIG. 1 is an exemplary flow chart illustrating a method of illumination expression of a head up display for a vehicle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described in detail with reference to the accompanying drawings.

As illustrated in FIG. 1, a method for illumination expression of a head up display for a vehicle according to an exemplary embodiment of the present invention may include turning on, by a controller, a vehicle and the head up display (S10); determining, by the controller, whether an auto light is operated (S20); illuminating, by the controller, the head up display in response to determining that the auto light is normally operated (S30), that is, operating without a failure; determining, by the controller, whether a tail lamp is operated in response to determining that the auto light is abnormally operated (e.g., has experienced a failure of any type) (S40); illuminating, by the controller, the head up display as a night condition (S50) when the tail lamp is normally operated; determining, by the controller, whether a tail switch is operated when the tail lamp is abnormally operated (S60); and illuminating, by the controller, the head up display as a daytime condition when the tail switch is abnormally operated (S70).

In the first step of turning on the vehicle and the head up display (S10), the head up display may begin to operate by turning on the vehicle and the head up display. In determining whether the auto light is operated (S20), is the controller may be configured to determine whether the auto light is operated by confirming an output value of the auto light mounted within the vehicle and that interlocks with the head up display. In illuminating of the head up display (S30) in response to determining that the auto light is normally operated, the auto light is in a normal operation state (e.g., not in a failure state) and thus the head up display may be displayed (e.g., illuminated). In step of illuminating the head up display when the auto light is normally operated (S30), illumination brightness of the head up display may be set to be a basic output value of the head up display. Further, when setting the basic output value of the head up display, the head up display may interlock with the auto light. In determining whether the auto light is abnormally operated (S40), the controller may be configured to determine whether the tail lamp mounted in the vehicle is operated.

Moreover, when the auto light is abnormally operated, whether the tail lamp is operated may be determined to determine whether the head up display is illuminated as the daytime condition or the night condition by determining whether the tail lamp interlocking with the auto light is operated, in which the daytime condition and the night condition will be described below.

In the step of illuminating the head up display as the night condition (S50), in response to determining whether the tail lamp is operated, in response to determining that the tail lamp is normally operated, the auto light is not operated but the tail lamp is operated, such that the illumination of the head up display is the night condition by being recognized as the night condition. In other words, in response to detecting an exterior night condition (e.g., a predetermined light condition), the head up display may be illuminated at a greater light level so facilitate viewing of the information displaying on the head up display. Further, the illumination brightness of the head up display may be output to meet the night illumination brightness set separately.

In the determining of whether the tail switch interlocking with the tail lamp is operated (S60), when it is determined that the tail lamp is abnormally operated, whether the tail switch is operated may also be determined by the controller. When the tail lamp is abnormally operated, whether the tail switch is operated may be determined to determine whether the head up display is illuminated as the daytime condition or as the night condition by determining whether the tail switch interlocking with the tail lamp is operated.

In the step of illuminating the head up display as the daytime condition (S70), in response to determining whether the tail switch is operated and that the tail switch is abnormally operated, both of the tail lamp and the tail switch may be prevented from being operated, such that the illumination of the head up display is expressed as the daytime condition by being recognized as the daytime condition. In other words, in response to detecting an exterior daytime condition (e.g., a light level above a predetermined value) the tail lamp and the tail switch may remain turned off. The illumination brightness of the head up display may be output to meet the daytime illumination brightness set separately. Further, when the tail switch is normally operated, the illumination of the head up display may be displayed as the night condition by being recognized as the night condition.

Meanwhile, in the method for illumination expression of a head up display for a vehicle, the illumination brightness of the head up display may be set as twenty steps (e.g., twenty different brightness levels) and thus in the daytime condition, for example, about sixteen steps among the twenty steps may be applied and in the night condition, about four steps may be applied, such that visibility in the daytime or at night may be improved. In other words, the illumination may be set as brighter or darker by changing the brightness level based on whether a daytime condition or a night condition is detected by the controller.

As described above, the exemplary embodiment of the present invention may implement logic to express the head up display even when the external illumination value is not input to the head up display due to the failure of the auto light, the communication disturbance, and the like, and when the external illumination value is abnormally input, the controller may be configured to determine the daytime condition or the night condition by combining whether the tail lamp is operated with whether the tail switch is operated. In particular, when both of the tail lamp and the tail switch are turned off, the daytime condition may be recognized and when the tail lamp is turned on, the night condition may be recognized independent of the tail switch condition. Thus, in the case of the daytime condition, the brightness of the head up display may be set as a daytime illumination setting value and visible minimum brightness may be applied in the daytime while disregarding a signal value of the auto light. In the case of the night condition, the brightness of the head up display may be set as the night illumination setting value and the visible minimum brightness may be applied at night while disregarding the signal value of the auto light.

Herein, the illumination setting value may be changed by differentiating the daytime condition and the night condition such that when the head up display is forcibly turned on due to the failure of the over light, and the like, the driver's view may be obstructed due to the illumination of the head up display at night to interrupt the driving. Therefore, the logic should be implemented to minimize the illumination of the head up display, since when the illumination of the head up display is reduced, the illumination may not be seen at all, set the illumination values for each daytime condition and night condition, when the tail lamp and tail switch conditions are different, preferentially determine the illumination of the head up display as the night, and minimize the illumination brightness of the head up display to minimize the obstruction of the driver's view in any events.

As set forth above, according to the exemplary embodiments of the present invention, even though the failure of the auto light, and the like occurs due to the external factors, the head up display may display the minimum information to improve the marketability and convenience. As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A method of illumination expression of a head up display for a vehicle, the method comprising:
   turning on, by a controller, the vehicle and the head up display which is mounted within the vehicle;
   determining, by the controller, whether an auto light is operated by confirming an output value of the auto light which is mounted within the vehicle and interlocks with the head up display;
   illuminating, by the controller, the head up display in response to determining that the auto light is normally operated;
   determining, by the controller, whether a tail lamp mounted within the vehicle is operated in response to determining that the auto light is abnormally operated;
   illuminating, by the controller, the head up display as a night condition in response to detecting an exterior night condition and that the tail lamp is normally operated;
   determining, by the controller, whether a tail switch is operated in response to determining that the tail lamp is abnormally operated; and
   illuminating, by the controller, the head up display as a daytime condition in response to detecting an exterior daytime condition and that the tail switch is abnormally operated.

2. The method according to claim 1, further comprising:
   illuminating, by the controller, the head up display as the night condition in response to determining that the tail switch is normally operated.

3. The method according to claim 1, wherein the illumination brightness of the head up display in the is set to be a basic output value of the head up display when illuminating the head up display in response to determining that the auto light is normally operated.

4. The method according to claim 3, wherein when the basic output value of the head up display is set, the head up display interlocks with the auto light.

5. The method according to claim 2, wherein the illumination brightness of the head up display is output to meet night illumination brightness set separately when illuminating the head up display as a night condition in response to detecting an exterior night condition and that the tail lamp is normally operated.

6. The method according to claim 1, wherein the illumination brightness of the head up display is output to meet daytime illumination brightness set separately when determining that the tail switch is abnormally operated.

7. A system of illumination expression of a head up display for a vehicle, the system comprising
   a memory configured to store program instructions; and
   a processor configured to execute the program instructions, the program instructions when executed configured to:
   turn on the vehicle and the head up display which is mounted within the vehicle;
   determine whether an auto light is operated by confirming an output value of the auto light which is mounted within the vehicle and interlocks with the head up display;
   illuminate the head up display in response to determining that the auto light is normally operated;
   determine whether a tail lamp mounted within the vehicle is operated in response to determining that the auto light is abnormally operated;
   illuminate the head up display as a night condition in response to detecting an exterior night condition and that the tail lamp is normally operated;
   determine whether a tail switch is operated in response to determining that the tail lamp is abnormally operated; and
   illuminate the head up display as a daytime condition in response to detecting an exterior daytime condition and that the tail switch is abnormally operated.

8. The system of claim 7, wherein the program instructions when executed are further configured to:
   illuminate the head up display as the night condition in response to determining that the tail switch is normally operated.

9. The system of claim 7, wherein the illumination brightness of the head up display in the is set to be a basic output value of the head up display when illuminating the head up display in response to determining that the auto light is normally operated.

10. The system of claim 9, wherein when the basic output value of the head up display is set, the head up display interlocks with the auto light.

11. The system of claim 8, wherein the illumination brightness of the head up display is output to meet night illumination brightness set separately when illuminating the head up display as a night condition in response to detecting an exterior night condition and that the tail lamp is normally operated.

12. The system of claim 7, wherein the illumination brightness of the head up display is output to meet daytime illumination brightness set separately when determining that the tail switch is abnormally operated.

13. A non-transitory computer readable medium containing program instructions executed by a controller, the computer readable medium comprising:
   program instructions that turn on the vehicle and the head up display which is mounted within the vehicle;

program instructions that determine whether an auto light is operated by confirming an output value of the auto light which is mounted within the vehicle and interlocks with the head up display;

program instructions that illuminate the head up display in response to determining that the auto light is normally operated;

program instructions that determine whether a tail lamp mounted within the vehicle is operated in response to determining that the auto light is abnormally operated;

program instructions that illuminate the head up display as a night condition in response to detecting an exterior night condition and that the tail lamp is normally operated;

program instructions that determine whether a tail switch is operated in response to determining that the tail lamp is abnormally operated; and program instructions that illuminate the head up display as a daytime condition in response to detecting an exterior daytime condition and that the tail switch is abnormally operated.

14. The non-transitory computer readable medium of claim 13, further comprising:

program instructions that illuminate the head up display as the night condition in response to determining that the tail switch is normally operated.

15. The non-transitory computer readable medium of claim 13, wherein the illumination brightness of the head up display in the is set to be a basic output value of the head up display when the program instructions illuminate the head up display in response to determining that the auto light is normally operated.

16. The non-transitory computer readable medium of claim 15, wherein when the basic output value of the head up display is set, the head up display interlocks with the auto light.

17. The non-transitory computer readable medium of claim 14, wherein the illumination brightness of the head up display is output to meet night illumination brightness set separately when the program instructions illuminate the head up display as a night condition in response to detecting an exterior night condition and that the tail lamp is normally operated.

18. The non-transitory computer readable medium of claim 13, wherein the illumination brightness of the head up display is output to meet daytime illumination brightness set separately when the program instructions determine that the tail switch is abnormally operated.

* * * * *